United States Patent [19]

Iio et al.

[11] Patent Number: 4,585,105
[45] Date of Patent: Apr. 29, 1986

[54] MULTIPLE DISC CLUTCH DEVICE AND METHOD OF MANUFACTURE THEREOF

[75] Inventors: Tomoyuki Iio; Katsuaki Mori, both of Hamamatsu, Japan

[73] Assignee: Fuji Chemical Co., Ltd., Japan

[21] Appl. No.: 524,218

[22] Filed: Aug. 18, 1983

[30] Foreign Application Priority Data

May 20, 1983 [JP] Japan .............................. 58-75625[U]

[51] Int. Cl.$^4$ .......................... F16D 3/14; F16D 13/52
[52] U.S. Cl. ................................. 192/70.17; 192/70.2; 192/106.2
[58] Field of Search .................. 192/70.2, 70.17, 106.2

[56] References Cited

U.S. PATENT DOCUMENTS

| | | | |
|---|---|---|---|
| 3,910,392 | 10/1975 | Foers | 192/70.17 |
| 4,220,233 | 9/1980 | Ban et al. | 192/106.2 |
| 4,440,282 | 4/1984 | Ishimaru et al. | 192/70.2 |

FOREIGN PATENT DOCUMENTS

| | | | |
|---|---|---|---|
| 1171274 | 5/1964 | Fed. Rep. of Germany | 192/70.2 |
| 910464 | 11/1962 | United Kingdom | 192/70.2 |

*Primary Examiner*—Alan Cohan
*Assistant Examiner*—John A. Rivell
*Attorney, Agent, or Firm*—Armsrong, Nikaido, Marmelstein & Kubovcik

[57] ABSTRACT

A multiple disc clutch device comprises a cylindrical clutch outer member having a cylindrical portion opened at one end and closed at the other end by a closing end wall. The cylindrical portion is provided in the inner periphery thereof with a plurality of engaging concave grooves formed along the generating lines of the cylindrical portion at a constant circumferential pitch. Each of a plurality of driving clutch discs has a plurality of engaging convex portions formed on the outer periphery thereof for slidably engaging with the engaging concave grooves in the clutch outer member. A driven gear is provided on the outer surface of the closing end wall of the clutch outer member. Buffer springs are disposed between first spring retainers formed on the driven gear and second spring retainers formed on the closing end wall so as oppose to the first spring retainers. The clutch outer member is made of steel sheet and the engaging concave grooves and the second spring retainers thereof are formed by rolling and by press working, respectively.

3 Claims, 2 Drawing Figures

MULTIPLE DISC CLUTCH DEVICE AND METHOD OF MANUFACTURE THEREOF

BACKGROUND OF THE INVENTION

1. Field of the Invention

The present invention relates to a multiple disc clutch device disposed between the engine and the transmission of, for example, a motorcycle and adapted to make and break a power transmitting connection thereby to selectively transmit the power of the engine to the transmission.

2. Description of the Prior Art

A typical known multiple disc clutch device of the kind mentioned above is constituted mainly by the following parts: namely, a cylindrical clutch outer member opened at its one end surface and closed at the its other end surface; a plurality of driving clutch discs each having a plurality of engaging convex portions formed on an outer peripheral surface thereof, the engaging convex portions being in engagement with engaging concave grooves formed in an inner peripheral surface of the cylindrical portion of the clutch outer member along the generating lines of the latter at a constant circumferential pitch; a driven gear provided on the outer surface of the closing end of the clutch outer member; and a buffer spring interposed between a first spring retainer formed on the driven gear and a second spring retainer formed on the closing end surface of the clutch outer so as oppose to the first spring retainer.

There are two ways for increasing the capacity of the clutch device of the kind mentioned above. The first way is to increase the number of the clutch discs, while the second way is to increase the set load of the clutch spring. Usually, the second way is preferred particularly when the desired clutch capacity exceeds a certain level, because the adoption of the first way is restricted by an accompanying requirement for a greater manipulation force on the clutch lever.

Hitherto, the annular core of the driving clutch disc is formed by die-casting from an aluminum alloy to have a considerably large thickness, so that an increase of the number in the clutch discs to be disposed therein inconveniently requires increasing the axial length of the apparatus resulting in a greater size of the clutch device as a whole. It is possible to reduce the axial length of the clutch device by forming the annular core metal of the driving clutch disc from a steel sheet having a smaller thickness. This, however, imposes a new problem. Namely, since the clutch outer member is formed of an aluminum alloy by die-casting, the engaging concave grooves formed therein are rapidly worn due to a large surface pressure exerted thereon by the annular core metal. This problem will be overcome by employing a greater number of engaging concave grooves, but the increase in the number of the engaging concave grooves is naturally limited for reasons concerning the formability and strength inherent to a die-cast clutch outer member.

The clutch outer member made of aluminum alloy suffers from another problem: that its second spring retainer, which is always in sliding contact with the buffer spring, is worn rapidly due to repeated contraction and extension of the buffer spring. In some cases, in order to obviate this problem, a steel seat is mounted on the second spring retainer. This countermeasure, however, is not desirable because not only the number of parts but also the number of steps of the assembling process is increased due to the necessity for positioning of the steel seat.

SUMMARY OF THE INVENTION

Accordingly, an object of the invention is to provide a multiple disc clutch device improved to eliminate the above-described problems of the prior art.

To this end, according to the invention, there is provided a multiple disc clutch device comprising: a cylindrical clutch outer member having a cylindrical portion opened at one end and closed at the other end by a closing end wall, the cylindrical portion being provided in the inner periphery thereof with a plurality of engaging concave grooves formed along the generating lines of the cylindrical portion at a constant circumferential pitch; a plurality of driving clutch discs each having a plurality of engaging convex portions formed on the outer periphery thereof and slidably engaging with the engaging concave grooves in the clutch outer member; a driven gear provided on the outer surface of the closing end wall of the clutch outer member; and buffer springs disposed between first spring retainers formed on the driven gear and second spring retainers so formed on the closing end wall as to oppose the first spring retainers; wherein the clutch outer member is made of steel sheet and the engaging concave grooves and the second spring retainers are formed by rolling and by press working, respectively.

The driving clutch disc has a core metal which may be formed of steel sheet. The clutch outer member made of steel sheet is preferably heat-treated.

The above and other objects, features and advantages of the invention will become clear from the following detailed description of the preferred embodiment taken in conjunction with the accompanying drawings.

DESCRIPTION OF THE PREFERRED EMBODIMENT

Figure 1:
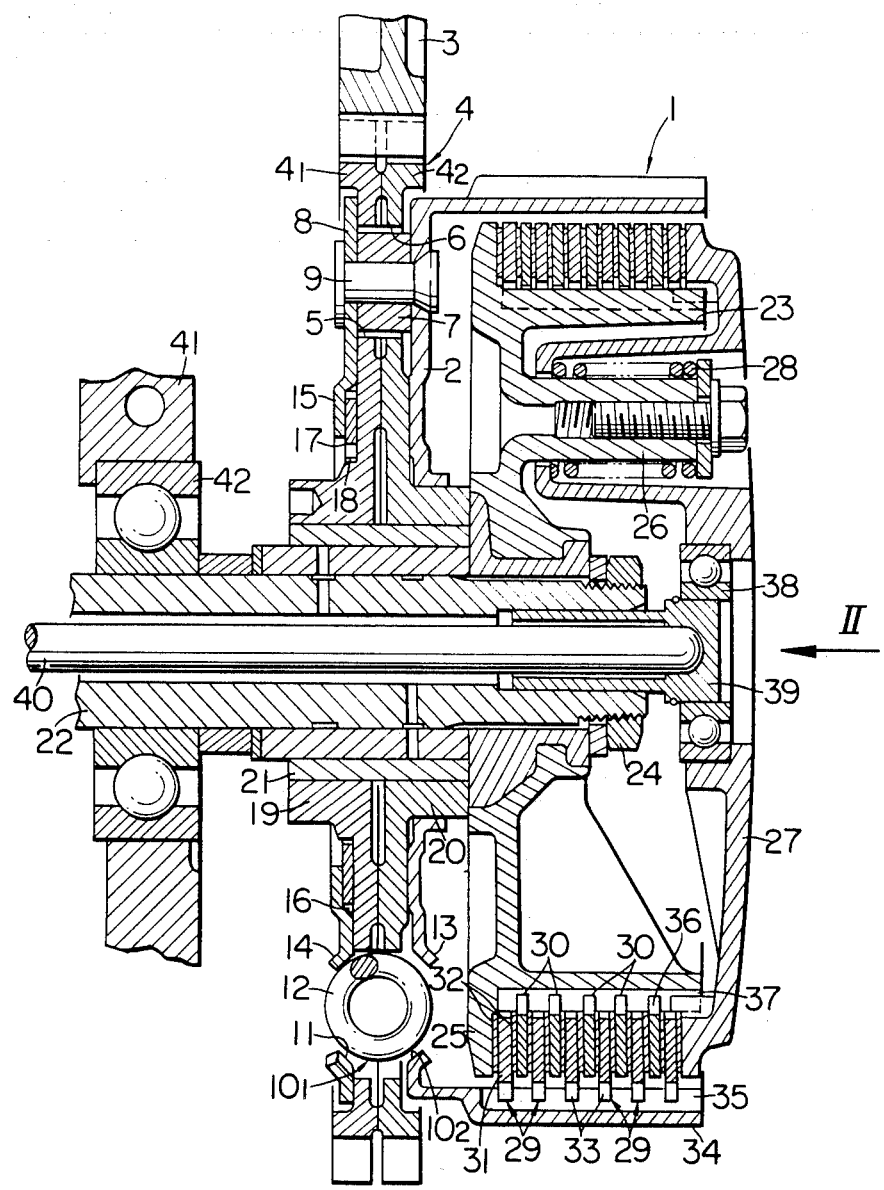
FIG. 1 is a vertical sectional front elevational view of an embodiment of the multiple disc clutch device made in accordance with the invention.
Figure 2:
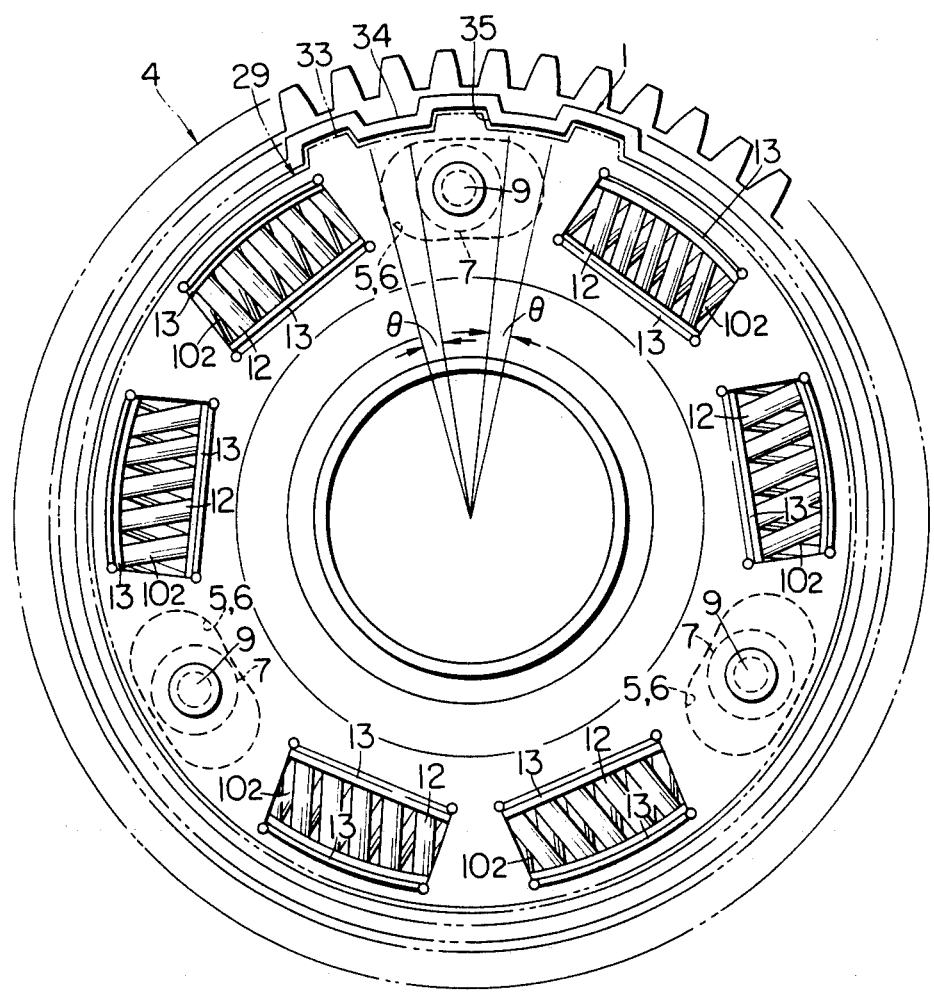
FIG. 2 is a side elevational view of the clutch device made in accordance with the invention as viewed in the direction of the arrow II in FIG. 1, showing how a clutch outer member, driving clutch discs and a driven gear are related to one another.

Referring to the drawings, a multiple disc clutch device made in accordance with the invention has a clutch outer member 1 which is shaped into a cylindrical form by press working from steel sheet to have one end opened and the other end closed by an end wall 2.

A driven gear 4, meshing with a driving gear 3 which is connected to an engine crankshaft not shown, is attached to the outer surface of the closing end wall 2 in a manner explained hereinbelow.

Namely, the driven gear 4 is composed of a first gear $4_1$ and a second gear $4_2$ both of which have disc portions provided with a plurality of circumferentially elongated slots 5, 6 formed at a constant circumferential pitch. Cylindrical bosses 7 welded to the outer surface of the closing end wall 2 are received by corresponding slots 5 and 6. A side plate 8 lapping the disc portion of the outermost first gear $4_1$ is fixed to the bosses 7 by means of rivets 9. The first gear $4_1$ and the second gear $4_2$ are rotatable relatively to the clutch outer member 1 within a region of angle afforded by the sliding engagement between the elongated slots 5, 6 and the bosses 7. In the normal state, however, each boss 7 takes the position mediately the ends of the corresponding slots 5, 6 and, therefore, the first and second gears $4_1$ and $4_2$ are rotatable in one and the other directions by an equal angle $\theta$ from this neutral position.

Substantially rectangular circumferentially extending first spring retainers $10_1$ are formed in the disc-shaped portions of the first and second gears $4_1$ and $4_2$. On the other hand, window-like second spring retainers $10_2$ are formed by a press working in the closing end wall 2 of the clutch outer member 1. The number and position of the second spring retainers $10_2$ correspond to those of the first spring retainers $10_1$. Windows 11 are formed in the portions of the side plate 8 corresponding to the positions of the first spring retainers $10_1$. First coiled buffer springs 12 are each interposed between the first and second spring retainers $10_1$ and $10_2$ with their axes directed in the circumferential direction of the closing end wall 2. In order to prevent the springs 12 from coming off, retainer tabs 13 and 14 in the form of collars are attached to the longer sides of the second spring retainer $10_2$ and the window 11.

The side plate 8 is provided with an annular step 15 formed by displacing the inner periphery thereof slightly outwardly. A saucer-shaped friction spring 17 is loaded in a flattened chamber 16 defined between the annular step 15 and the first gear $4_1$. The spring 17 is strongly pressed at its outer periphery and inner periphery to the side plate 8 and the first gear $4_1$, respectively. The inner periphery of the spring 17 is constituted by a plurality of elastic claws 18. The spring 17 produces a reactional force which acts also to press the second gear $4_2$ and the clutch outer member 1 strongly to each other.

A bearing 21 is fitted between the inner peripheral surfaces of bosses 19 and 20 of the first and second gears $4_1$ and $4_2$. The gears $4_1$ and $4_2$ are rotatably carried by a main shaft 22 of a transmission. A clutch inner member 23 disposed within the clutch outer member 1 is splinefitted to the main shaft 22 and is fixed by means of a nut 24.

The clutch inner member 23 is provided at its one end with a flange-shaped pressure receiving plate 25 and at its other end with a plurality of support shafts 26 extending axially therefrom. A pressurizing plate 27 is slidably supported by these support shafts 26. The support shafts 26 each carry also a clutch spring 28 which resiliently biases the pressurizing plate 27 towards the pressure receiving plate 25.

Disposed between the pressure receiving plate 25 and the pressurizing plate 27, are a plurality of driving clutch discs 29 and driven clutch discs 30. The driving and driven clutch discs 29 and 30 are arranged alternatingly. The driving clutch disc 29 is comprised of an annular core metal 31 made of a steel plate and friction members 32 jointed to both sides of the inner periphery of the annular core metal. The annular core metal 31 is provided on the outer periphery thereof with a plurality of engaging convex portions 33 formed at a constant circumferential pitch. The engaging convex portions 33 engage with a plurality of engaging concave grooves 35 formed in a cylindrical portion 34 of the clutch outer member 1 formed by rolling to extend along the generating lines of the clutch outer member 1. The arrangement is such that the driving clutch discs 29 are allowed to slide in the axial direction with respect to the clutch outer member 1. The driven clutch disc 30 has no friction member, but is provided on the inner periphery thereof with a plurality of engaging convex portions 36 formed at a constant circumferential pitch and held in engagement with engaging concave portions 37 formed on the clutch inner member 23 so as to extend along the generating lines of the latter, so that the driven clutch discs 30 are allowed to slide in the axial direction with respect to the clutch inner member 23.

A release cylinder 39 fits in the center of the pressurizing plate 27 through the medium of a release bearing 38. A push rod 40 extending through the main shaft 22 is connected at its one end to the release cylinder 39.

In the drawings, a reference numeral 41 designates a crankcase of an engine which supports the main shaft 22 through a bearing 42.

The operation of this multiple disc clutch device is as follows.

When the clutch device is in the "on" condition, i.e. in the power transmitting condition, the pressurizing plate 27 cooperates with the pressure receiving plate 25 in clamping therebetween the driving and driven clutch discs 29 and 30 by the force of the clutch spring 28, so that clutch discs 29 and 30 make frictional engagement with each other. Therefore, the power is transmitted from the engine to the main shaft 22 of the transmission through the driving gear 3, driven gear 4, buffer springs 12, clutch outer member 1, driving clutch discs 29, driven clutch discs 30 and the clutch inner member 23. Any impacting torque caused by an increase of the load on the main shaft 22 is absorbed by the contraction of the buffer springs 12.

The compression of the buffer springs 12 continues until the angle of relative rotation between the driven gear 4 and the clutch outer member 1 reaches the aforementioned value $\theta$. Thereafter, the torque is transmitted directly from the driven gear 4 to the clutch outer member 1 because the bosses 7 on the clutch outer member 1 contact with the end walls of the elongated slots 5, 6 in the first and second gears $4_1$, $4_2$.

On the other hand, when the push rod 40 is pressed to cause the pressurizing plate 27 to move to the right as viewed in FIG. 1 through the release cylinder 39 and the release bearing 38, the frictional engagement between the driving clutch discs 29 and the driven clutch discs 30 is released to turn the clutch device into the "off" or non-transmitting condition.

As has been described, according to the invention, the clutch outer member is made of a steel plate and the engaging concave grooves in the cylindrical portion of the clutch outer member are formed by rolling. It is, therefore, possible to attain a remarkable increase in the number of the engaging concave grooves as compared with the conventional clutch outer member made of an aluminum alloy by die-casting. In addition, it is easy to suitably select the shape of the engaging concave groove so as to decrease the torque born by each engaging concave groove. This in turn suppresses the tendency of wear of the engaging concave grooves even when the annular core metal of the driving clutch disc is made of a steel sheet. It is, therefore, possible to reduce the axial length and, hence, the overall size of the multiple disc clutch device.

In addition, since the second spring retainer on the closing end wall of the clutch outer member is formed by a press working, the second spring retainer is as a result formed of the same material as the clutch outer member, thereby suppressing the wear of the second spring retainer remarkably.

Furthermore, it is possible to heat-treat the clutch outer member made of steel sheet thereby to improve the wear resistance of the engaging concave grooves and the second spring retainer.

Although the invention has been described through specific terms, it is to be noted here that the described embodiments are only illustrative and various changes and modifications may be imparted thereto without departing from the scope of the invention which is limited solely by the appended claims.

What is claimed is:

1. An improved method of manufacturing a multiple disc clutch device including a cylindrical clutch outer member having a cylindrical portion opened at its one end and closed at its other end by a closing end wall, said cylindrical portion being provided at an inner periphery thereof with a plurality of concave grooves formed along generated lines of said cylindrical portion at a constant circumferential pitch; a plurality of driving clutch discs each having a plurality of convex portions formed on an outer periphery thereof and slidably engaging with said concave grooves in said clutch outer member; a driven gear provided on an outer surface of said closing end wall of said clutch outer member, said driven gear being rotatable within a limited angle of rotation relative said clutch outer member; a plurality of first spring retainers formed on said driven gear; a plurality of second spring retainers formed on said closing end wall of said clutch outer member corresponding to and opposing said first spring retainers; and a plurality of buffer springs each disposed between said opposing first and second spring retainers; the improvement comprising:

forming said clutch outer member of steel sheet;

roll-forming said plurality of concave grooves in said inner periphery of said cylindrical portion of said clutch outer member;

press-forming said second spring retainers on said closing end wall;

welding a plurality of cylindrical bosses to said outer surface of said closing end wall of said clutch outer member;

positioning said driven gear over said plurality of cylindrical bosses of said closing end wall of said clutch outer member, said plurality of cylindrical bosses being received in corresponding slots formed in said driven gear; and fixing a side plate lapping a disc portion of an outer surface of said driven gear to said plurality of cylindrical bosses by riveting.

2. An improved method of manufacturing a multiple disc clutch device according to claim 1, further comprising:

press-forming said plurality of second spring retainers integrally with said closing end wall of said clutch outer member.

3. An improved method of manufacturing a multiple disc clutch device according to claim 2 further comprising:

heat-treating said clutch outer member having formed therein said plurality of concave grooves and said plurality of second spring retainers of said closing end wall thereof, for improving the wear resistance of said concave grooves and second spring retainers.

* * * * *